United States Patent [19]

Pearson et al.

[11] Patent Number: 5,848,189
[45] Date of Patent: Dec. 8, 1998

[54] METHOD, APPARATUS AND SYSTEM FOR VERIFICATION OF PATTERNS

[75] Inventors: Eric Clifford Pearson, Waterloo; Bradley John McCloy, New Dundee; Joseph Daniel Burjoski, Waterloo, all of Canada

[73] Assignee: Focus Automation Systems Inc., Waterloo, Canada

[21] Appl. No.: 622,193

[22] Filed: Mar. 25, 1996

[51] Int. Cl.[6] .................................................. G06K 9/68
[52] U.S. Cl. ........................ 382/218; 382/257; 382/141
[58] Field of Search ................................... 382/141, 145, 382/149, 218, 219, 257, 308

[56] References Cited

U.S. PATENT DOCUMENTS

| 4,395,697 | 7/1983 | Dargel et al. . |
| 4,395,698 | 7/1983 | Sternberg et al. . |
| 4,395,700 | 7/1983 | McCubbrey et al. . |
| 4,398,176 | 8/1983 | Dargel et al. . |
| 4,477,926 | 10/1984 | Linger et al. . |
| 4,484,346 | 11/1984 | Sternberg et al. . |
| 4,546,444 | 10/1985 | Bullis . |
| 4,641,356 | 2/1987 | Sternberg ............................... 382/257 |
| 4,685,144 | 8/1987 | McCubbrey et al. . |
| 4,869,211 | 9/1989 | Hunt et al. . |
| 4,922,337 | 5/1990 | Hunt et al. . |
| 4,949,172 | 8/1990 | Hunt et al. . |
| 5,434,629 | 7/1995 | Pearson et al. . |
| 5,452,368 | 9/1995 | LeBeau . |

FOREIGN PATENT DOCUMENTS 0054598  6/1982  European Pat. Off. .

OTHER PUBLICATIONS

J.W.V. Miller, "Architectural Consideration for Linear–Camera Vision Systems",SPIE vol. 1615 Machine Vision Architechtures, Integration, and Application, 1991.

Brad Harkavy, "The Application of a Flexible Machine Vision Architecture ot the Inspection of Continuous Process Materials," Society of Manufacturing Engineers, Technical Paper #MS89–165, 1989.

"CCD Linear Array Sensor Ensures High Speed Flaw Detection On Printed Material", Product Brochure of Futec Printec, date unknown.

"Optical Inspection System, Model PCD", Product Brochure of Futec International Corp., Date Unknown.

"BCON 1000 Print Quality Inspection System", Product Brochure of Nireco Corporation, Dec. 1993.

"Automated Print Inspection", Product Brochure of Futec International Corp., Date Unknown.

Product Advertisment , Pin Plus, Ektron Applied Imaging, Date Unknown.

"ESIS –100% Sheet Inspection", Product Brochure, Ektron Applied Imaging, Mar. 8, 1995.

"Wide–Web Target", Package Printing & Converting, Oct. 1995, pp. 38, 40–42, 44.

*Primary Examiner*—Phuoc Tran
*Attorney, Agent, or Firm*—Robert P. Stratton

[57] ABSTRACT

A method, apparatus and system for verifying the establishment of a pattern includes a unit for storing a template of the pattern, a unit for acquiring an image of the established pattern, a first image processing unit to alter at least one of said template and acquired images to produce at least two resultant images, a comparison unit to compare the two resultant images with the other of said template and acquired image and a unit to evaluate the results of each comparison to determine if the established pattern includes a defect. Both gray scale and binary processing and comparisons are disclosed for use as required.

20 Claims, 19 Drawing Sheets

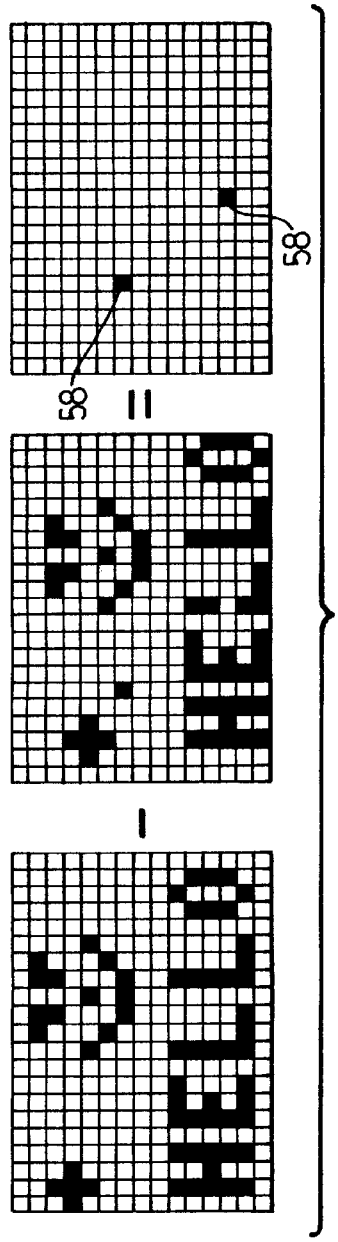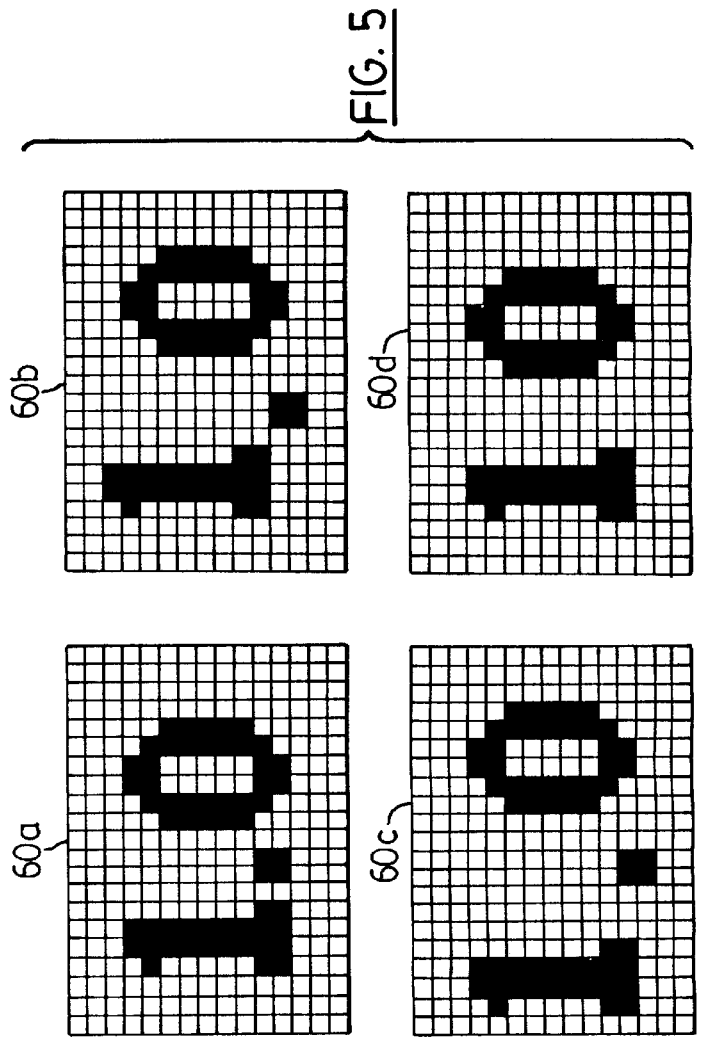

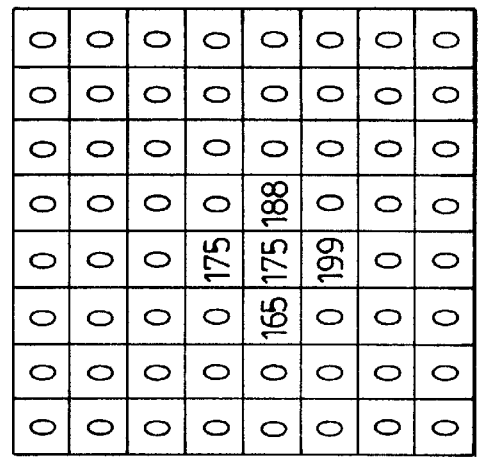
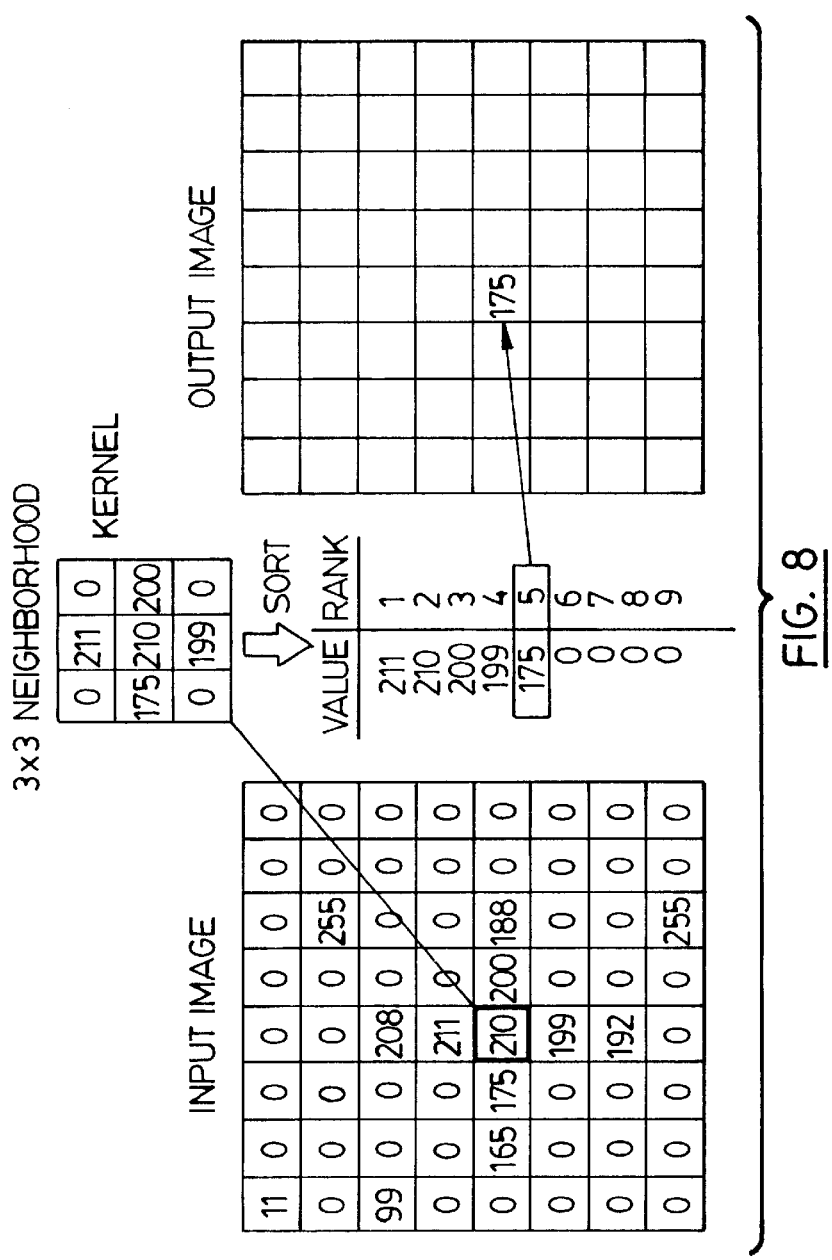
FIG. 9
FIG. 8

METHOD, APPARATUS AND SYSTEM FOR VERIFICATION OF PATTERNS

FIELD OF THE INVENTION

The present invention relates to a method, apparatus and system for the automatic verification of patterns established on a substrate or other surface. More specifically, the present invention relates to a system and method for determining if an established pattern contains one or more defects.

BACKGROUND OF THE INVENTION

In many fields, such a printing, it is desired to determine that a pattern has been properly formed on the substrate or other target surface. For example, when printing labels for pharmaceuticals, it is desirable to insure that dosage information has been properly printed on the label. Specifically, a defect such as one which resulted in one or more labels having a missing decimal point which would otherwise change 1.0 mg to 10 mg, with perhaps serious and/or fatal results, is unacceptable. Similarly, for any high quality printing such as postage stamps or security printing for lottery tickets, etc., it is important that the printed pattern be correct within preselected bounds. This is also true for other patterns such as printed circuit boards, semiconductor device features, flexible printed circuits, etc.

Prior art verification of printed patterns has been performed either post production (i.e.—after the pattern establishment process has been completed) or in real-time (i.e.— while the pattern establishment process is being performed). Post production verification has disadvantages in that a great deal of wastage can occur as there is no immediate feedback to the pattern establishing process, to correct the process in view of detected defects. Thus, if for example a process error occurs in the middle of a production run, half of the production run of finished product may include defects and have to be discarded. Further, post production verification requires an additional, separate step and therefore results in increased labor costs and increases the time required to complete a production run.

Real-time verification systems are therefore often preferred over post production systems. However, prior art real-time verification systems suffer from their own problems in that, when high confidence is required in determining errors, many false indications of defects are produced as no means is available to distinguish between actual defects and acceptable variations due to normal pattern establishment process variations. In some circumstances, when high confidence is not required, the occurrence of false indications of defects in prior art systems has been lowered by reducing the sensitivity of the pattern verification system, but this necessarily results in reduced quality control of the final product.

Further, due to limitations in the speed with which prior art systems could perform verification, such systems often required the limitation of the production speed of the pattern establishment process to less than the available maximum processing speed.

It is desired therefore, to have a pattern verification system which can verify the establishment of patterns to a desired degree of accuracy, accommodate normal process variations without indicating false defects and which can operate with relatively high speed pattern establishment processes.

SUMMARY OF THE INVENTION

It is an object of the present invention to provide a novel method, apparatus and system for determining if an established pattern contains a defect which obviates or mitigates at least one of the disadvantages of the prior art.

According to a first aspect of the present invention, there is provided a method of determining if an established pattern contains one or more defects, comprising the steps of:

(i) defining a digital template image representing a desired pattern;

(ii) acquiring a digital image of an established pattern;

(iii) image processing at least one of said defined digital template and said acquired digital image to obtain at least first and second resultant images;

(iv) performing at least one pair of comparisons comprising: a first comparison between the other of said defined template and said acquired digital image and said first resultant image; and a second comparison between the other of said defined template and said acquired digital image and said second resultant image;

(v) evaluating the results of at least said at least one pair of comparisons to determine if said established pattern contains one or more defects.

According to another aspect of the invention, there is provided a system to determine if an established pattern contains one or more defects, comprising:

means to store a defined digital template for said pattern;

means to acquire a digital image of said established pattern;

image processing means to process at least one of said defined digital template and said acquired digital image to obtain at least first and second resultant images;

means to perform at least one pair of comparisons comprising a comparison between the other of said defined digital template and said acquired digital image and said first resultant image and a comparison between the other of said defined digital template and said acquired digital image and said second resultant image; and means to evaluate the results of said comparisons to determine if said established pattern contains one or more defects.

BRIEF DESCRIPTION OF THE DRAWINGS

Preferred embodiments of the present invention will now be described, by way of example only, with reference to the attached Figures, wherein:

FIG. 4 shows a representation of a prior art subtraction technique to identify defects in a pattern;

FIG. 5 shows a representation of images of four possible configurations of an example pattern;

FIG. 8 shows a representation of a median rank filter being applied to one of the digital values of FIG. 7;

FIG. 9 shows a representation of the result of the processing the array of FIG. 7 with a median rank filter;

DETAILED DESCRIPTION OF THE INVENTION

Figure 1:
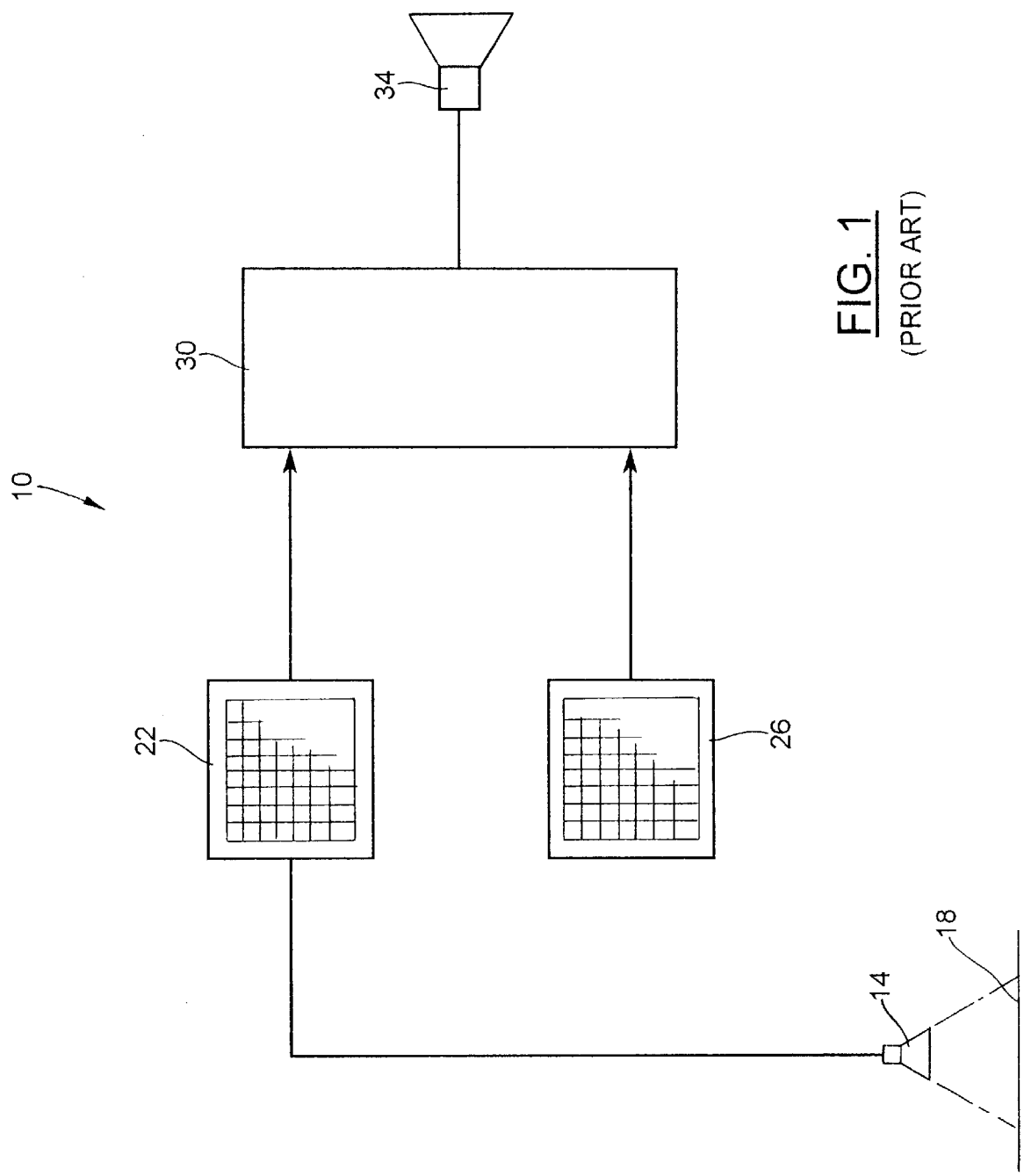
FIG. 1 shows a block diagram of a prior art pattern verification system.

For clarity, a prior art pattern verification system will first be described before detailed discussion of the present invention. A pattern verification system is indicated generally at 10 in FIG. 1. System 10 comprises a suitable camera 14 which acquires an image of a pattern 18 to be verified. As used herein, the term pattern is intended to comprise any text, schematic, graphics, physical configuration or other features which can be imaged by camera 14. Also, as used herein the spraying, pressing, embossing, etching, lithographing, depositing, mounting or otherwise causing a pattern to be formed is referred to as establishing a pattern.

The image from camera 14 is digitized and stored in image digitizer 22 in the form of an array of 8 bit pixels, the value of each pixel representing the degree of darkness in the acquired digitized image with 0 being black and with 255 being white.

In system 10, the desired pattern has been digitized and stored in image memory 26. This stored image of the desired pattern is commonly referred to as a template or 'golden template' as it represents the ideal pattern image against which the acquired image will be compared. A suitable processor 30 then compares, as described below, the template image in image memory 26 to the acquired image stored in digitizer 22 and produces an output to output means 34, which may be a video display, an error annunciator or any other suitable output device as will occur to those of skill in the art.

Figure 2:
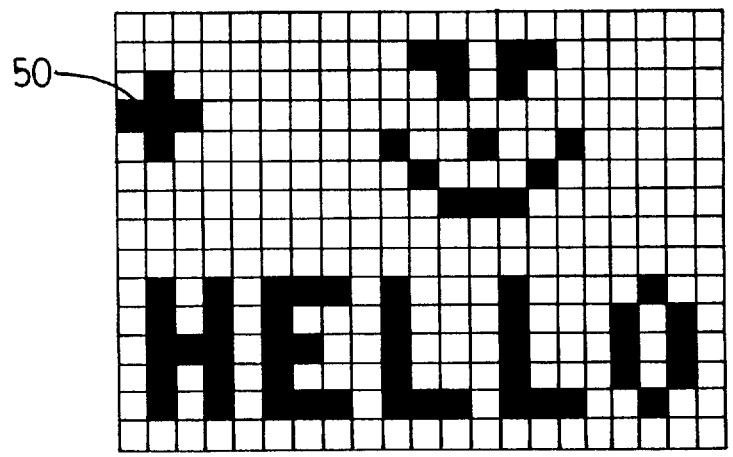
FIG. 2 shows a representation of a template image.
Figure 3:
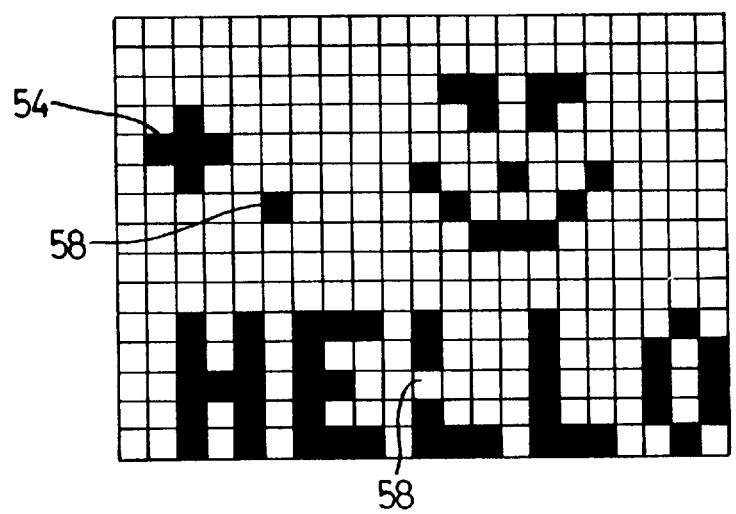
FIG. 3 shows a representation of an image of a pattern to be verified.

Specifically, the comparison process proceeds as follows. FIG. 2 shows a representation of the template image stored in image memory 26 and FIG. 3 shows a representation of an image which has been acquired by camera 14 and digitized and stored in digitizer 22. It will be understood by those of skill in the art that, while these images are shown in the Figures with the pixels being represented with filled blocks, in fact the digitized images are stored as an array of digital values which may be operated upon mathematically by processor 30.

A reference fiducial 50 is included in the template image and a corresponding reference fiducial 54 is included in the pattern whose image was acquired by camera 14. These reference fiducials are used to align the images so that they are spatially coincident. In example of FIGS. 3 and 4, assuming that the upper left hand pixel of each Figure is indexed as (0,0), the center of fiducial 54 is located at (4,2) whereas the center of the fiducial 50 in the template image is located at (3,1). Accordingly, to make the images spatially coincident, the acquired image is shifted left one pixel and upwards one pixel by processor 30.

Once the template and acquired images are spatially coincident, a simple subtraction operation is performed to identify defects. As shown in FIG. 4, in an ideal situation any non-zero valued pixels in the result of this operation represent defects in the acquired image. Specifically, the two non-zero pixels 58 in the result are the two defects in the acquired image. These two pixels can be output to output means 34 or used in any other manner to report the detection of defects in the pattern under consideration.

Unfortunately, the prior art system described above has serious drawbacks when it is applied to many typical pattern establishment processes. One of the main problems with such prior art systems is that most processes for establishing a pattern are not perfect and experience some variation in the established pattern which is not considered to be a defect. For example, in printing processes the positioning of various features will often drift, relative to an intended position and/or to each other, due to normal process variations. For example, FIG. 5 shows four images including three images 60a, 60b and 60c wherein the positioning of the decimal point has drifted relative to the 1 and 0 features and one image 60d wherein the decimal point has not been printed.

Figures 6, 7:
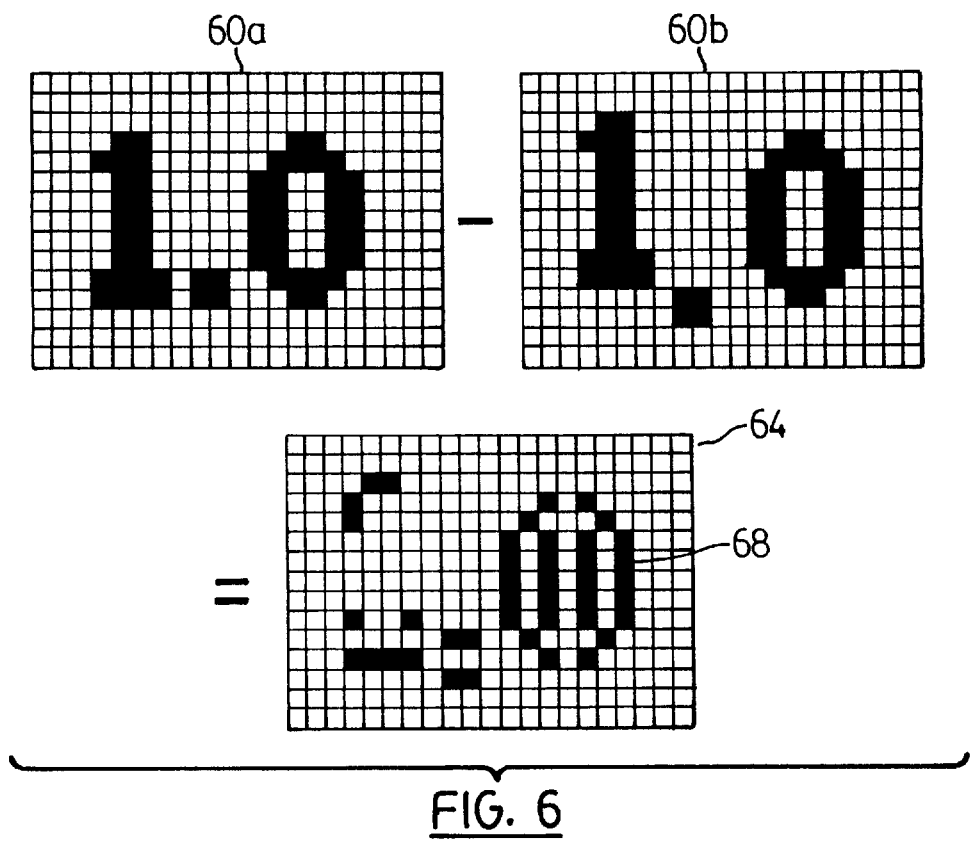
FIG. 6 shows a representation of a prior art subtraction technique to identify defects.
FIG. 7 shows an array of digital values representing an image of a pattern.

If the above-described prior art system 10 is employed to verify the patterns of images 60b, 60c and 60d, using image 60a as a template, analysis of each of images 60b, 60c and 60d will result in defects being reported to output means 34, even though only image 60d actually contains a defect, i.e.—the missing decimal point. For example, the outcome of the subtraction operation-type analysis of image 60b using image 60a as a template is shown in FIG. 6 wherein the resultant 64 indicates multiple false defects 68.

The present invention will now be described with reference to FIGS. 7 through 27. The present invention is operable to detect defects in the establishment of a pattern while reducing or even eliminating the number of false defects which would be produced due to normal process variations in the establishment of a pattern. In the immediately following discussion, a printing process will be discussed as a representative example of a method of establishing patterns. It will be appreciated however, by those of skill in the art, that the present invention is not limited to use with printed patterns and can in fact be used with a wide range of pattern establishment processes including, but not limited to, lithography, etching, gravure printing, sputtering of layers, mechanical placement of components, etc.

In the present invention, features of a pattern are allowed to drift, due to normal process variations, within predefined bounds. However, if the features drift outside of these predefined bounds, or if the features are malformed or missing, or if spurious features are present, a defect will be deemed to have occurred.

In one preferred embodiment which operates with gray scale images, the present invention utilizes four separate comparison operations, described below. When processing speed is of interest, such as in the real-time monitoring of a high speed printing process, these comparison operations may be conducted in parallel. While, as is discussed below, the outcome of a properly selected pair of comparison operations can provide adequate defect detection, it is believed that the outcome of two properly selected pairs of comparison operations provides an additional advantage in detecting defects.

The present invention makes use of known image processing techniques. Specifically, in the presently preferred gray scale embodiment of the instant invention, discussed below with reference to FIGS. 7 through 15, a form of image processing which is referred to as gray scale morphology is employed. Further, in the presently preferred embodiment, the gray scale morphology operations are implemented with rank value filters. As will be apparent to those of skill in the art, the present invention is not limited to rank value filter-based gray scale morphology, and any other suitable image processing technique and/or implementation may be employed.

In the presently preferred binary embodiment of the instant invention, discussed below with reference to FIGS. 16 through 28, the preferable image processing technique which is employed is a form of correlation filtering, specifically binary correlation, although any other suitable binary image processing technique may also be employed.

Rank value filters, such as those used in the gray scale morphology embodiment, operate on each pixel in an image by ranking the values of the pixels in a neighborhood (kernel) centered on the pixel being processed, referred to herein as the target pixel. The size of the neighborhood, also referred to as the size of the kernel, can be defined as R rows by C columns and the resulting value of the target pixel is calculated by taking all of the unprocessed pixel values in the R by C kernel centered on the target pixel and sorting them. The resulting value of the target pixel, in a filter of rank N, is set to the value of the Nth ranked pixel. Depending upon the value selected for the rank N, various filter effects may be obtained, including a minimum, maximum and/or median filter.

FIG. 7 shows an eight by eight pixel representation of an image which is mostly dark (low valued pixels) and which has a light '+' feature centered at (4,3), assuming that the upper left corner is indexed as (0,0), and which also has a few randomly positioned light spots. FIG. 8 demonstrates the application of a rank value filter with a three by three kernel and N=five, when applied to a target pixel located at (4,3) in FIG. 7. With a three by three kernel, setting N=5 results in a median rank filter function as the ranked fifth value of the nine values is the median value. As shown, the pixels in the three by three kernel centered on (4,3) range in value from 211 to 0 with the fifth ranked value being 175. Thus, the resulting value for the target pixel is 175.

The complete result of applying the median rank value filter to the image of FIG. 7 is shown in FIG. 9 wherein it can be seen that the random light spots have been eliminated and the size and lightness (i.e.—the value of the pixels) of the '+' feature have been reduced, although its shape and positioning have not changed.

With N set to the highest rank, a maximum rank filter is obtained. When applied to a gray scale image, a maximum rank filter results in the erosion (i.e.—thinning out) of dark features and the dilation (i.e.—fattening up) of light features and is referred to herein as a "dilation" or "dilate" operation.

Conversely, with N set to the lowest rank, a minimum rank filter is obtained. When applied to a gray scale image, a minimum rank filter results in the dilation of dark features and the erosion of light features and is referred to herein as an "erosion" or "erode" operation.

It will be understood by those of skill in the art that the descriptions above refer to a gray scale value system wherein dark image pixels are low valued and light image pixels are high valued. In the reverse system, wherein dark image pixels are high valued and light image pixels are low valued, the above-described effects of the maximum and minimum rank filters are reversed, i.e.—a minimum rank filter will dilate light features and erode dark features and a maximum rank filter will erode light features and dilate dark features. However, as used herein, the term "erode" or "erosion" refers to the erosion of light features and the term "dilate" or "dilation" refers to the dilation of light features and the opposite effects on dark features. It will also be understood by those of skill in the art that gray scale image pixels need not be 8-bit values and other larger or smaller values, as appropriate to the particular application of the present invention, may be employed as desired.

In the presently preferred gray scale embodiment, the instant invention employs four comparison operations which are presently believed to be advantageous for use in identifying defects. These comparison operations are intended to detect: 'extra dark feature' defects; 'missing dark feature' defects; 'extra light feature' defects; and 'missing light feature' defects. Each comparison will be described in turn below.

The comparison to identify a missing dark feature defect can be represented by $$Live_{ERODE} \leq Template_{RAW} + \Delta_i$$

where $Live_{ERODE}$ is the acquired image which has been processed with an appropriate morphological filter (for example, a minimum rank in the case of light valued pixels having greater values than dark valued pixels), $Template_{RAW}$ is the non-processed template image and $\Delta_i$ is an image intensity threshold which is proportional to the intensity value in the template image. $\Delta_i$ is described in more detail below.

In this comparison, as in all of the other comparisons described below, $Template_{RAW}$ can be a template which is predefined and stored in a memory or it can be an image which has been previously acquired. For example, in some circumstances $Template_{RAW}$ can be the unprocessed live image ($Live_{RAW}$) acquired during the last verification operation.

As will be apparent to those of skill in the art, in this missing dark feature comparison and all of the other comparisons described below, the size of the kernel defines the bounds about the template position within which a feature must be found or else a defect is detected. For example, a three by three kernel, such as that referred to above with respect to FIG. 8, allows a feature to drift up to one pixel in any direction from its position in the template. Therefore, defining the size of the kernel used in the rank filtering will define the desired limits for variance in the established pattern. Of course, it is possible to define different kernel sizes for different regions of the pattern to be verified. For example, in the case of the pharmaceutical label mentioned above, a three by three kernel can be employed when image processing a region of the label image which contains dosage information and a five by five kernel can be employed when image processing the remainder of the label. Further, processing with the three by three kernel may proceed in parallel with processing with the five by five kernel or in seriatim, depending upon the particular hardware implementation.

As will be apparent to those of skill in the art, the kernel need not be square and thus the limits for variance can be defined separately for horizontal and vertical directions. For example, a rectangular kernel can be employed if feature drift is acceptable to a larger extent in one direction (e.g.— 'x' or horizontal) than in the other direction (e.g.—'y' or vertical). Also, non-rectilinear kernel shapes may be employed. For example, a generally circular kernel can be employed when feature drift in a radial manner is acceptable.

In the representations shown in FIGS. 10a through 13c, and described below, a spatially corresponding line of pixels in each of the acquired image and the template image, at least one of which has been image processed by a selected morphological filter, is being compared. In these one dimensional representations of the processing of the two dimensional images, the heights of the traces reflect the value of the respective pixels, with higher traces (values) indicating lighter pixels.

The datums for the two traces are spaced by the value $\Delta_i$ which allows for a predefined amount of variation in the intensity of the pattern. In a preferred embodiment of the present invention, $\Delta_i$ varies for pixels within the template. Specifically, a value for $\Delta_i$ is predetermined for each possible pixel value using a logarithmic function. This simulates the operation of the human eye in that $\Delta_i$ is larger for brighter pixels and smaller for darker pixels. In such a case, a larger change in intensity in bright areas is required than the complementary change in dark areas. Thus, the index 'i' for $\Delta_i$ is merely the corresponding pixel value for which the respective $\Delta_i$ has been predetermined. As will be apparent to those of skill in the art, other techniques of implementing $\Delta_i$ can also be favorably employed, including setting $\Delta_i$ to a constant value, calculating $\Delta_i$ based upon the values and locations of surrounding pixels, etc.

In these comparisons, an acquired image which exactly corresponds to the template image would be represented by an identical pair of traces, vertically spaced by the value $\Delta_i$. A non-identical but defect free pattern is represented by any pair of non-intersecting traces and a pattern with one of more defects is represented by a pair of traces with at least one intersection point. It will be understood by those of skill in the art, that the representations in these Figures are only intended as a convenient means to convey the operation of the comparisons described herein and that the comparisons are in fact performed mathematically and need not be performed on lines of pixels, but instead can be performed in any sequence provided that pairs of spatially coincident pixels of interest are compared.

Figure 10B:
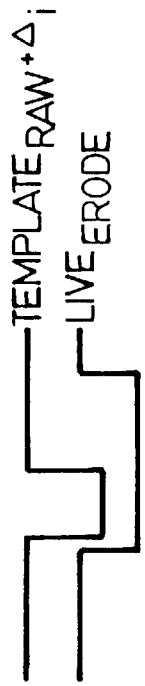
FIGS. 10a through 10d represent possible outcomes of a dark feature missing comparison.
Figure 10D:
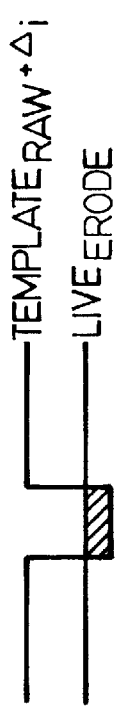
Figure 10A:

FIG. 10a shows a representation of the missing dark feature comparison wherein the dark feature is present and no drift has occurred from the template position and no defect is thus detected. This is apparent as there is no intersection of the traces and the lowered area of the $Live_{ERODE}$ trace, which represents the pixels of the dark feature in the acquired image, is centered about the lowered area of the Template trace, which represents the pixels of the dark feature in the Template. As will be apparent to those of skill in the art, the widening of the lowered area of the $Live_{ERODE}$ trace in the Figure is the result of the erosion of the light features (and the corresponding dilation of the dark feature) by the morphological filter.

FIG. 10b shows a representation of the same comparison wherein the dark feature in the acquired image has drifted from the template position, but by an amount less than half the kernel size and thus no defect is detected.

Figure 10C:

FIG. 10c shows a representation of the same comparison wherein the dark feature in the acquired image has drifted from the template position by an amount greater than half of the kernel size and thus a defect is detected, as indicated by the shaded, overlapped, portion.

Finally, FIG. 10d shows a representation of the same comparison wherein the dark feature is missing in the acquired image (no lowered area in the $Live_{ERODE}$ trace) and thus a defect is detected, as indicated by the shaded, overlapped, portion.

Figure 11A:
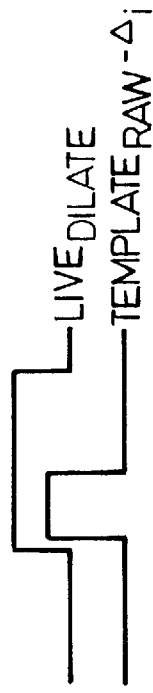
FIGS. 11a through 11d represent possible outcomes of a light feature missing comparison.
Figure 11B:
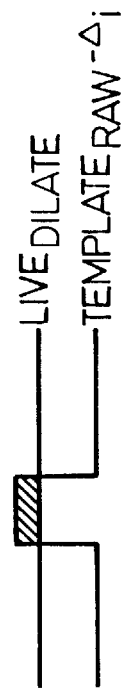
Figure 11C:
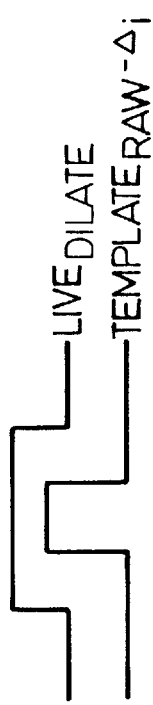
Figure 11D:
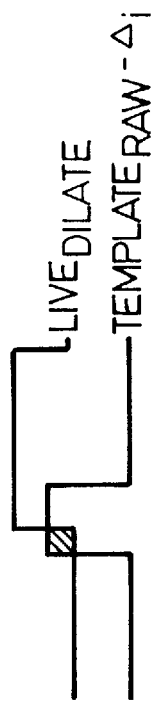

The missing light feature comparison can be represented by $$Live_{DILATE} \geq Template_{RAW} - \Delta_i$$

wherein $Live_{DILATE}$ is the acquired image which has been processed by a morphological filter which dilates the light features, $Template_{RAW}$ is the unprocessed template image and $\Delta_i$ is a delta value, as described above. FIG. 11a shows a representation of this comparison wherein the light feature is present in the acquired image and has not drifted and thus no defect is reported. FIG. 11b shows a representation of this comparison wherein the light feature is present in the acquired image and has drifted from the template position by an amount less than one half the kernel size and thus no defect is reported. FIG. 11c shows a representation of this comparison wherein the light feature is present in the acquired image and has drifted from the template position by an amount greater than one half the kernel size and thus a defect is reported. Finally, FIG. 11d shows a representation of this comparison wherein the light feature is missing from the acquired image and thus a defect is reported.

Figure 12A:
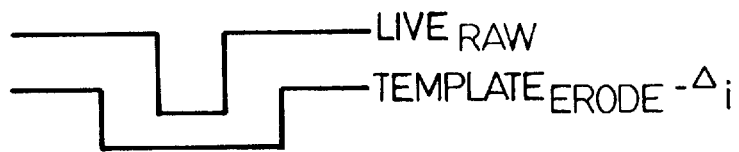
FIGS. 12a through 12c represent possible outcomes of an extra dark feature comparison.
Figure 12B:
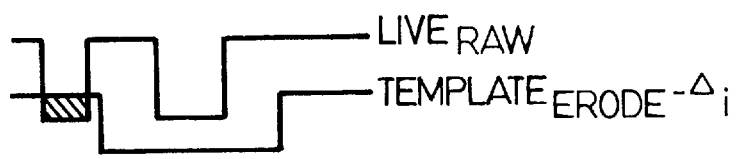
Figure 12C:
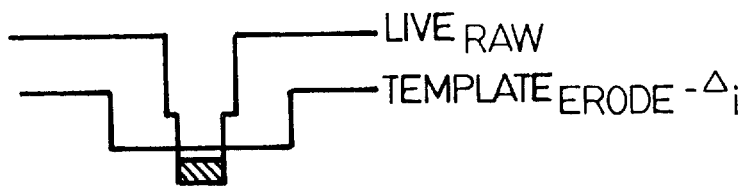

The extra dark feature comparison can be represented by $$Live_{RAW} \geq Template_{ERODE} - \Delta_i$$

where $Live_{RAW}$ is the unprocessed acquired image, $Template_{ERODE}$ is the template image to which an appropriate morphological filter has been applied to erode the light features and $\Delta_i$ is a delta value, as described above. FIG. 12a shows a representation of this comparison wherein an expected dark feature is found in the acquired image at the template position and thus no defect is reported. FIG. 12b shows a representation of this comparison wherein an extra dark feature is detected in the acquired image and thus a defect is reported. FIG. 12c shows a representation of this comparison wherein a dark feature is detected in the acquired image at the template location, but it is too dark (i.e.—black rather than gray) and thus an error is detected.

Figure 13A:
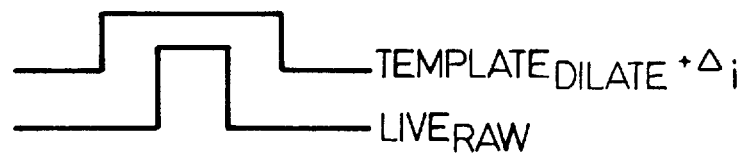
FIGS. 13a through 13c represent possible outcomes of an extra light feature comparison.
Figure 13B:
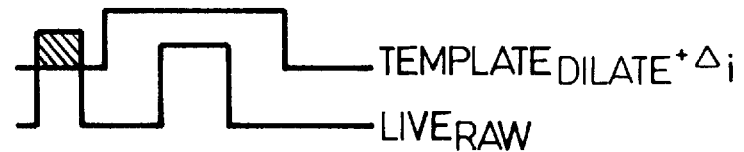
Figure 13C:
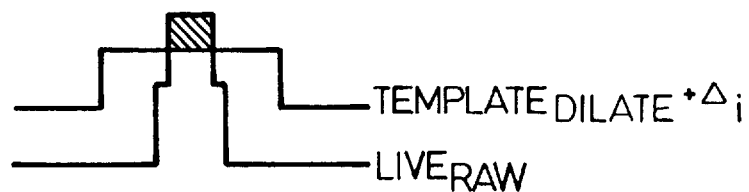

The extra light feature comparison can be represented by $$Live_{RAW} \leq Template_{DILATE} + \Delta_i$$

where $Live_{RAW}$ is the unprocessed acquired image, $Template_{DILATE}$ is the template image to which an appropriate morphological filter has been applied to dilate the light features and $\Delta_i$ is a delta value, as described above. FIG. 13a shows a representation of this comparison wherein an expected light feature is found in the acquired image at the template position and thus no defect is reported. FIG. 13b shows a representation of this comparison wherein an extra light feature is detected in the acquired image and thus a defect is reported. FIG. 13c shows a representation of this comparison wherein a light feature is detected in the acquired image at the template location, but it is too light (i.e.—white rather than gray) and thus an error is detected.

It is contemplated that other comparisons can also be employed with the present invention to identify categories or types of defects prevalent in other particular pattern establishment processes. For example, the comparisons $$Live_{ERODE} \leq Template_{DILATE} + \Delta_i$$

$$Live_{DILATE} \geq Template_{ERODE} - \Delta_i$$

are similar to the extra dark feature and extra light feature comparisons given above, but allow for a greater degree of drift of the pattern. The selection of other suitable comparisons for use with gray scale embodiments of the present invention will be apparent to those of skill in the art and will not be discussed further herein.

The present inventors have determined that by performing at least one appropriate corresponding pair of comparisons, the instant invention can provide good pattern verification/defect detection performance. For example, as will be apparent to those of skill in the art, for dark patterns established on a light substrate one appropriate corresponding pair is the extra dark feature comparison and the missing dark feature comparison. Once the comparisons have been performed, their results can be combined through a logical OR to identify defects.

Similarly, for light patterns established on a dark background, an example of an appropriate corresponding pair of comparisons is the extra light feature comparison and the missing light feature comparison. Again, once the two comparisons have been performed, their results can be combined through a logical OR to identify defects.

Figure 14:
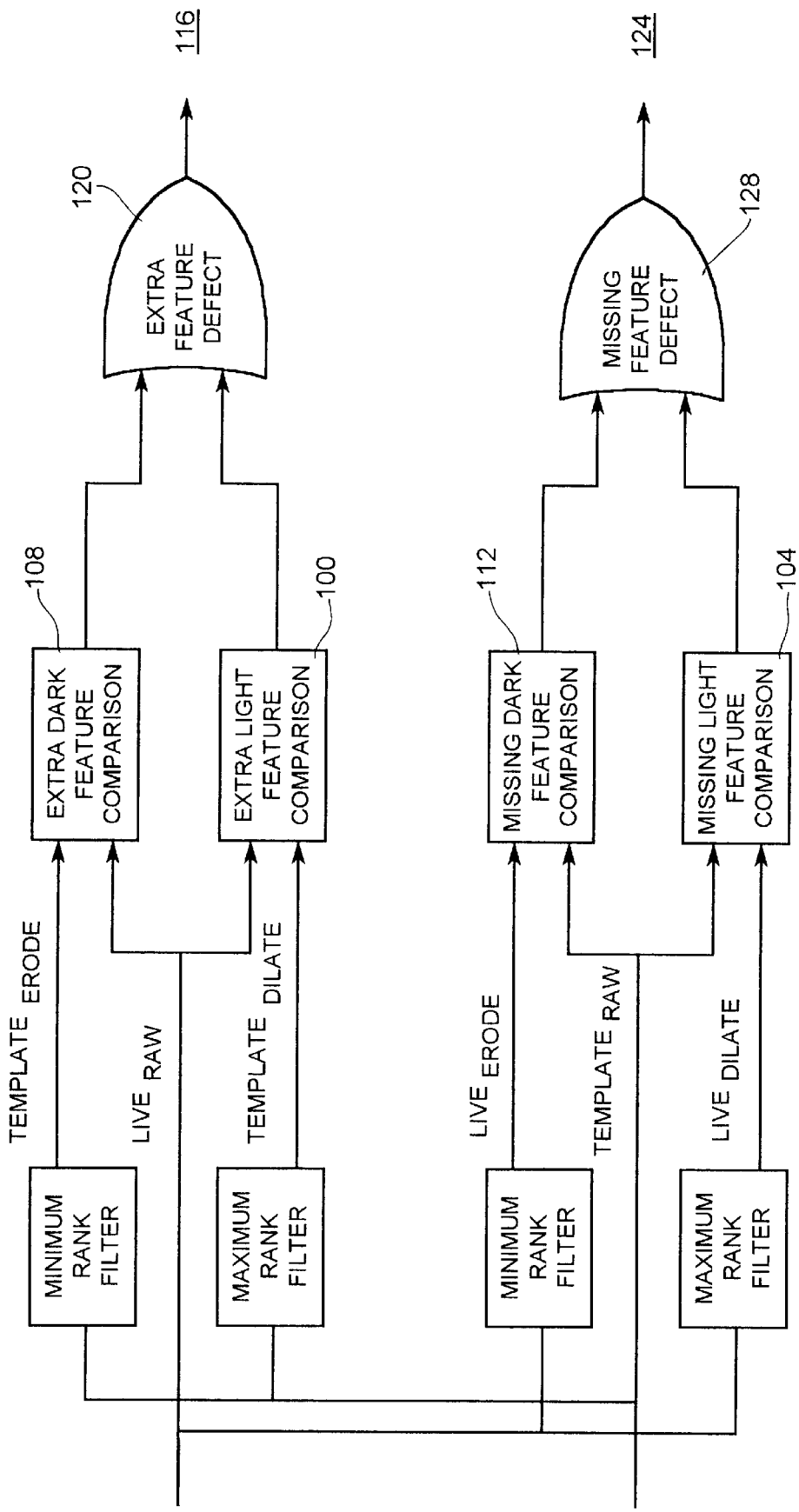
FIG. 14 shows a block diagram of a preferred configuration of a gray scale system in accordance with the present invention which employs four comparisons.

While an appropriate corresponding pair of comparisons provides good pattern verification performance, in a preferred gray scale embodiment of the present invention, shown in FIG. 14, four comparisons (two pairs) are employed. Specifically, the extra light feature comparison 100, missing light feature comparison 104, extra dark feature comparison 108 and missing dark feature comparison 112 are all performed. An output 116 indicating Extra Feature Defects can be provided by combining the outputs of extra dark feature comparison 108 and extra light feature comparison 100 through a logical OR 120, as can an output 124 indicating Missing Feature Defects by combining the outputs of missing light feature comparison 104 and missing dark feature comparison 112 through a logical OR 128.

While the above-described combination of four comparisons is presently preferred, it will be apparent to those of skill in the art that alternative configurations can be employed. For example, the four comparisons shown in FIG. 14 can be arranged to combine the outputs of extra light feature comparison 100 and missing light feature comparison 104 through a logical OR operation and to combine the output of extra dark feature comparison 108 and missing dark feature comparison 112 through a logical OR to obtain outputs indicating Light Feature Defects and Dark Feature Defects.

In some embodiments of the present invention, the Template data will not change during a pattern verification process. Accordingly, the processed Template data (i.e.—$Template_{ERODE}$ or $Template_{DILATE}$) may either be derived as required, as described above with reference to FIG. 14, or pre-computed once and stored for use as needed in a suitable memory. Also, as will be apparent to those of skill in the art, for clarity the buffers or other associated functions required to process the signals have been omitted from FIG. 14. For example, if required the $Live_{RAW}$ signal can be stored in a FIFO buffer before being transmitted to Extra Dark Feature Comparison 108 so that the $Template_{ERODE}$ data and the $Live_{RAW}$ data arrive at Extra Dark Feature Comparison 108 simultaneously.

Figure 15:
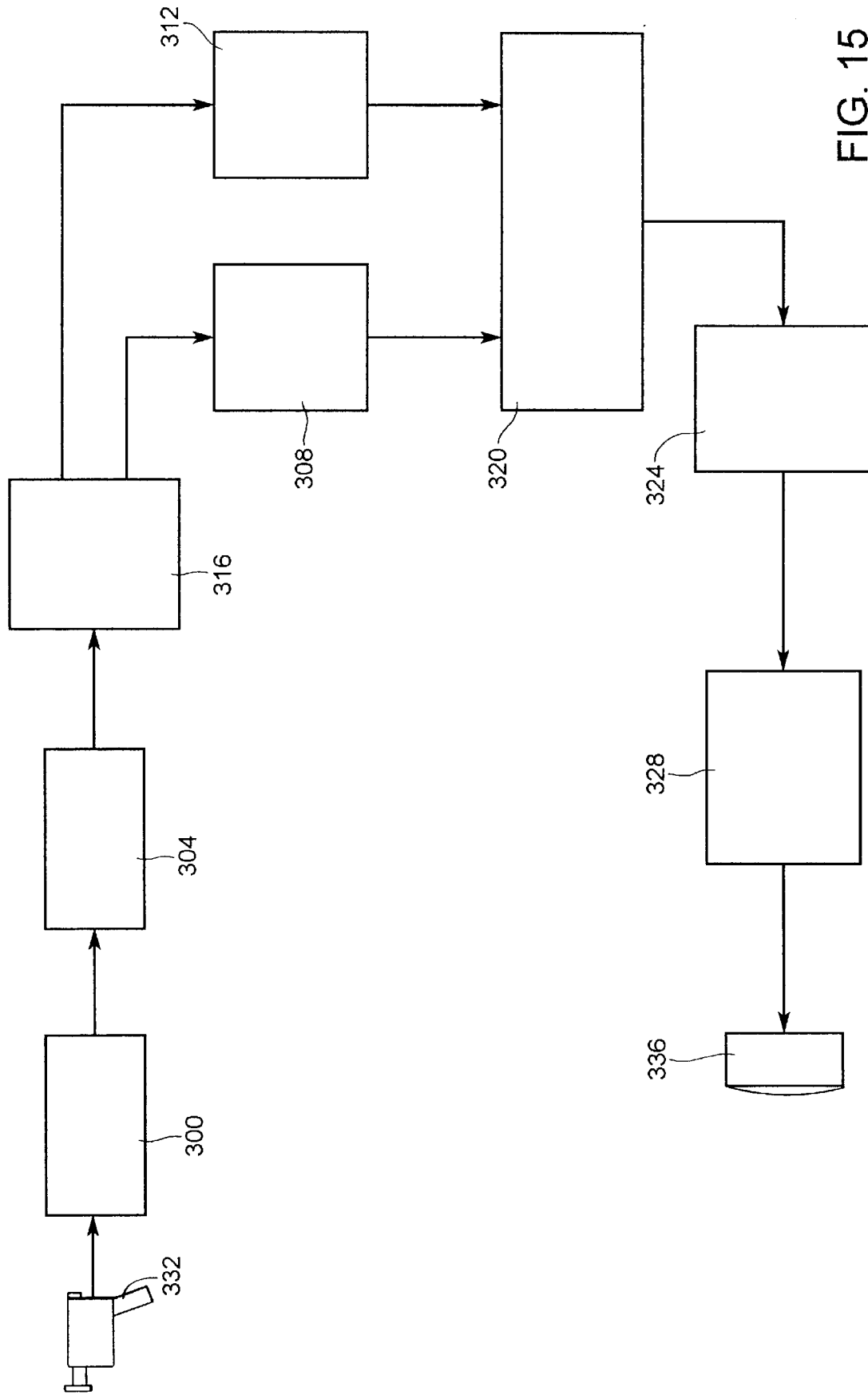
FIG. 15 shows the system of FIG. 14 as implemented in commercially available Cyberscan® modules.

The implementation of the presently preferred gray scale embodiment of the present invention described above is not particularly limited and implementations in dedicated hardware, general purpose computers and/or digital signal processors are contemplated. The present inventors have implemented the gray scale embodiment of the present invention with various Cyberscan® modules, as shown in FIG. 15, which are commercially available from Focus Automation Systems Inc., 3-554 Parkside Drive, Waterloo, Ontario, Canada, N2L 5Z4 and which are described in U.S. Pat. No. 5,434,704. In the Figure, eight Cyberscan® modules are employed, and specifically the system comprises: a CAM-DDC3-00 camera module 300; three BUF-1000-00 buffer modules 304, 308, 312; a GMF-2000-00 gray scale morphology module 316; a BMF-8000-00 binary morphology module 320; a LUT-1000-00 look up table module 324; and a PCD-1000-00 display module 328. In this implementation, the $Live_{RAW}$ image, is acquired by a suitable camera 332 and any defects detected by the system are displayed to an operator on a conventional monitor 336.

It should be noted that one of the perceived advantages of the present invention is its susceptibility to implementation in parallel hardware to provide relatively high speed pattern verification/defect detection. For example, in the embodiment shown in FIG. 14, each morphological filter can be implemented by a separate processor, as can each feature comparison. If additional speed is required, two or more processors can perform subsets of each morphological filter function or comparison and the depth of the data pipeline can also be increased as desired.

As will be apparent to those of skill in the art, the embodiment of the present invention described above is not limited to gray scale patterns. Color patterns can be verified by performing the above-described process on each of three acquired images, each image having been acquired by a separate camera equipped with a respective appropriate color filter (for example—Red, Blue and Green). Alternatively, a color camera can be employed to acquire a color digitized image in an appropriate format, such as an interleaved bitmap, etc. and an appropriate digital color-space conversion operation (Hue, Saturation and Brightness (HSV) or Luminance, Chrominance r and Chrominance b (YCrCb), etc.) can be performed to provide three $Live_{RAW}$ image data streams.

In some pattern verification applications, it is possible to determine the presence or absence of a feature using a binary template and an acquired binary image. For example, in a printed circuit board verification process, it is possible to arrange the lighting, camera, and optics of the image acquiring system such that, in the acquired image, the conductive (copper) traces appear pure white and the circuit board substrate appears pure black. In such a case, the image can be represented by an array of bits, wherein a bit which is equal to 1 represents a white, foreground, pixel (i.e.—a copper trace) and a bit which is equal to 0 represents a black, background, pixel (i.e.—the substrate). Such images are referred to herein as binary images and are a special subclass of the more general class of digital images which may have pixels represented by a range of values greater than 0 and 1.

In a presently preferred binary embodiment of the present invention, in order to verify an established pattern represented by a binary image, binary correlation is employed as the image processing operation. In a binary correlation process, a kernel of preselected size and shape is centered over the target pixel and the value of all of the image pixels within the kernel are summed. This sum is then compared to a predefined threshold value to determine the new value for the target pixel with the target pixel being set to 1 if the threshold is exceeded and 0 if it is not. If, for example, the threshold is set to zero, a binary dilation operation is performed (e.g.—Template$_{DILATE}$ or Live$_{DILATE}$ is obtained). If, on the other hand, the threshold is set to the maximum possible value for the selected kernel (for example a 7×7 kernel has a maximum value of 49), a binary erosion operation is performed (e.g.—Template$_{ERODE}$ or Live$_{ERODE}$ is obtained). Of course, other threshold values (i.e.—near max, near min, etc.) may be employed as will occur to those of skill in the art and, in the case wherein dark features are represented by 1's and light features by 0's, the results of the thresholds is reversed. Also, other binary correlation operations exist and any suitable binary correlation operation may be employed as will occur to those of skill in the art.

One of the advantages of binary correlation over the above-described gray scale embodiment of the present invention is that, generally, binary correlation requires less computation than gray scale morphology and the processors required to implement it are therefore generally less expensive than those required for gray scale morphology.

In the presently preferred binary embodiment of the present invention, for pattern verification/defect detection purposes five binary comparisons can be performed, as described below, and each comparison may be performed on the white (foreground) features and on the black (background) features for a total of ten possible comparisons. A description of each comparison operation follows.

In addition to the Live$_{RAW}$, Live$_{DILATE}$, Live$_{ERODE}$, Template$_{RAW}$, Template$_{ERODE}$ and Template$_{DILATE}$ data which are similar to those described above in reference to the gray scale embodiment, the binary comparisons described herein can also employ Live$_{OPEN}$ and Live$_{CLOSE}$ data. The Live$_{OPEN}$ data is obtained by performing an erode correlation operation on the acquired image and then performing a dilate correlation operation on that result. The Live$_{CLOSE}$ data is obtained by performing a dilate correlation operation on the acquired image and then performing an erode operation on that result. As will be apparent to those of skill in the art, the Live$_{OPEN}$ processing operates to open or 'break apart' two objects joined by an isthmus or the like and the Live$_{CLOSE}$ processing operates to close or 'fill in' holes in solid objects.

In the presently preferred binary embodiment of the present invention, the Live$_{ERODE}$ and Template$_{ERODE}$ images are obtained by performing a maximum (or near maximum, as desired) threshold binary correlation operation on the corresponding RAW signals and the Live$_{DILATE}$ and Template$_{DILATE}$ images are obtained by performing a minimum (or near minimum, as desired) threshold binary correlation operation on the corresponding RAW signals. It will be apparent to those of skill in the art however, that any other suitable binary erode and dilate operations can be employed as will occur to those of skill in the art.

The ten binary comparisons which can be employed in the presently preferred binary embodiment of the present invention are listed in Appendix A, as are the types of defects for which they are perceived to be useful in detecting. It is presently contemplated that the kernel sizes selected for each comparison would be the same, although it will be apparent to those of skill in the art that this need not be the case and different operations can employ kernels of different sizes as desired and/or appropriate. As will also be apparent to those of skill in the art, in cases wherein the foreground is merely the inverse of the background of an acquired image, some of the ten comparisons will be redundant. In the more general case wherein the foreground and background images may have been acquired with different binarization thresholds, there may be no redundancy of the comparisons.

Verification of patterns/detection of defects with binary comparisons is accomplished in the same manner as the above-described verification with gray scale comparisons, with the comparison data sets being spatially aligned and then processed by appropriate correlation or other filters as required and the selected comparisons being performed. The results of the comparisons are then evaluated to determine if defects are present.

Figure 16A:
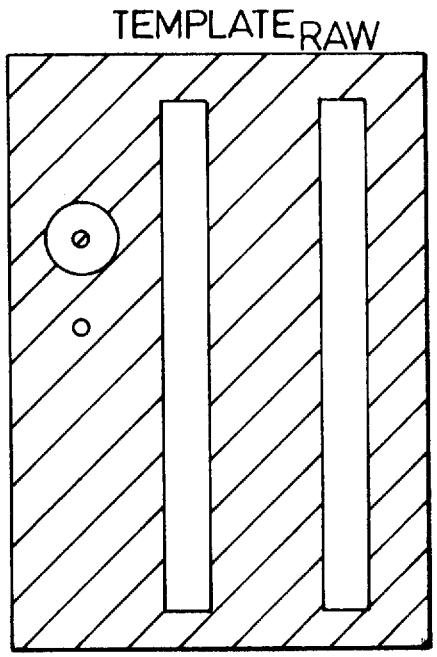
FIG. 16a shows an example Template image for use in performing a pattern verification with binary comparisons.
Figure 16B:
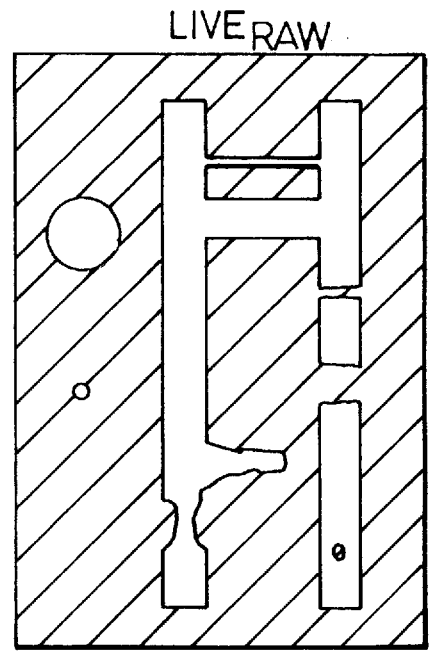
FIG. 16b shows an example pattern image to be verified with binary comparisons.

FIG. 16a shows an example of a template image for pattern verification with binary comparisons and FIG. 16b shows an example of an acquired Live image of an established pattern which is to be verified. As is apparent, the pattern shown in FIG. 16b contains numerous defects. FIGS. 17 through 26 show the defects which will and will not be detected by each of the respective ten comparisons listed in Appendix A.

Figure 17:
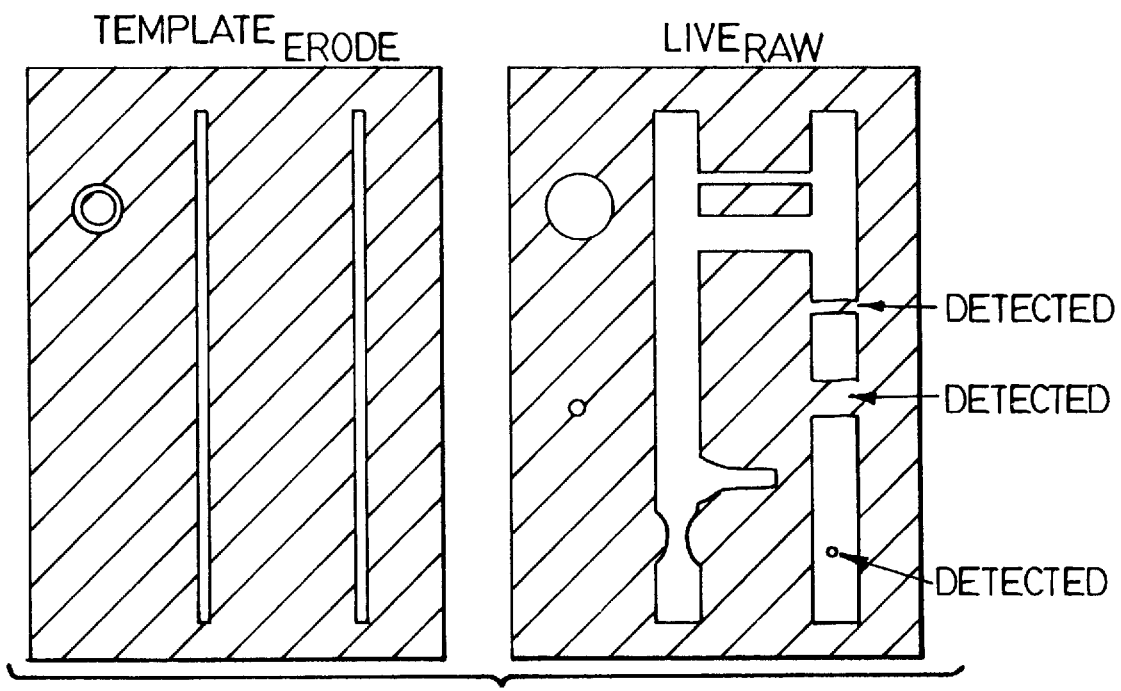
FIG. 17 shows a graphical representation of the results of a first binary comparison.
Figure 18:
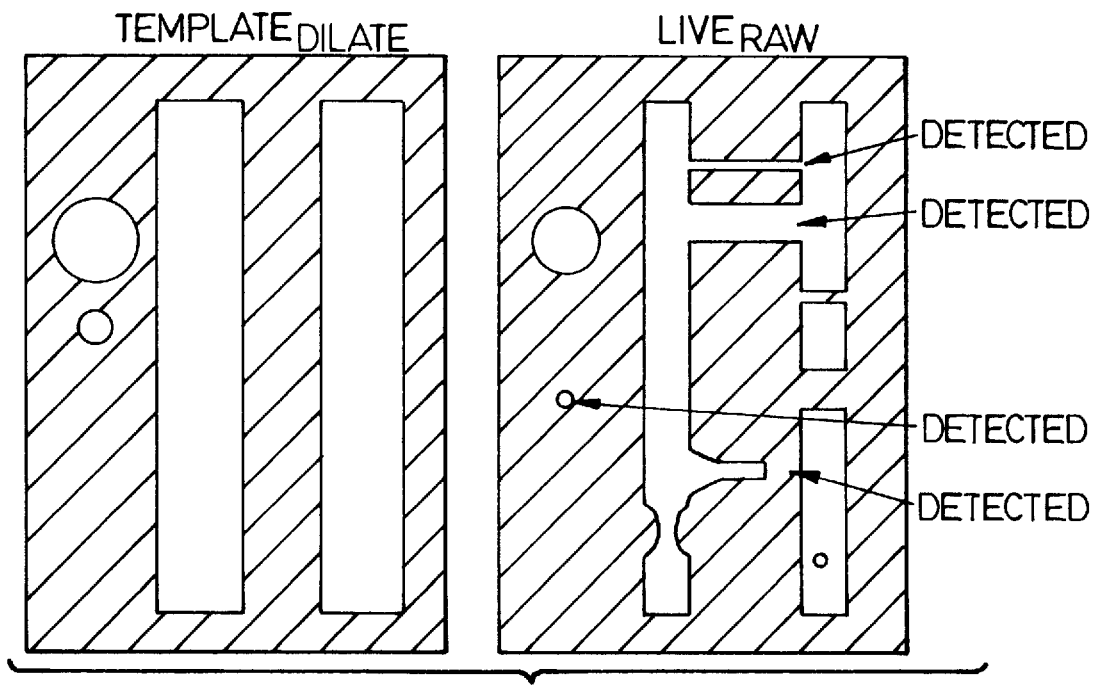
FIG. 18 shows a graphical representation of the results of a second binary comparison.
Figure 19:
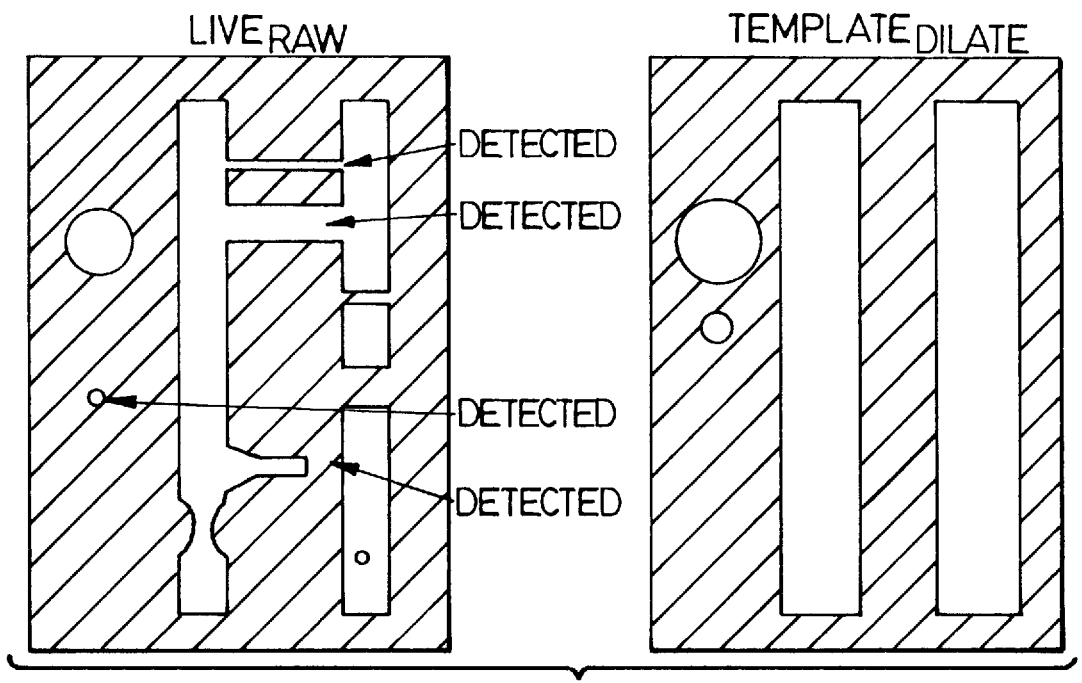
FIG. 19 shows a graphical representation of the results of a third binary comparison.
Figure 20:
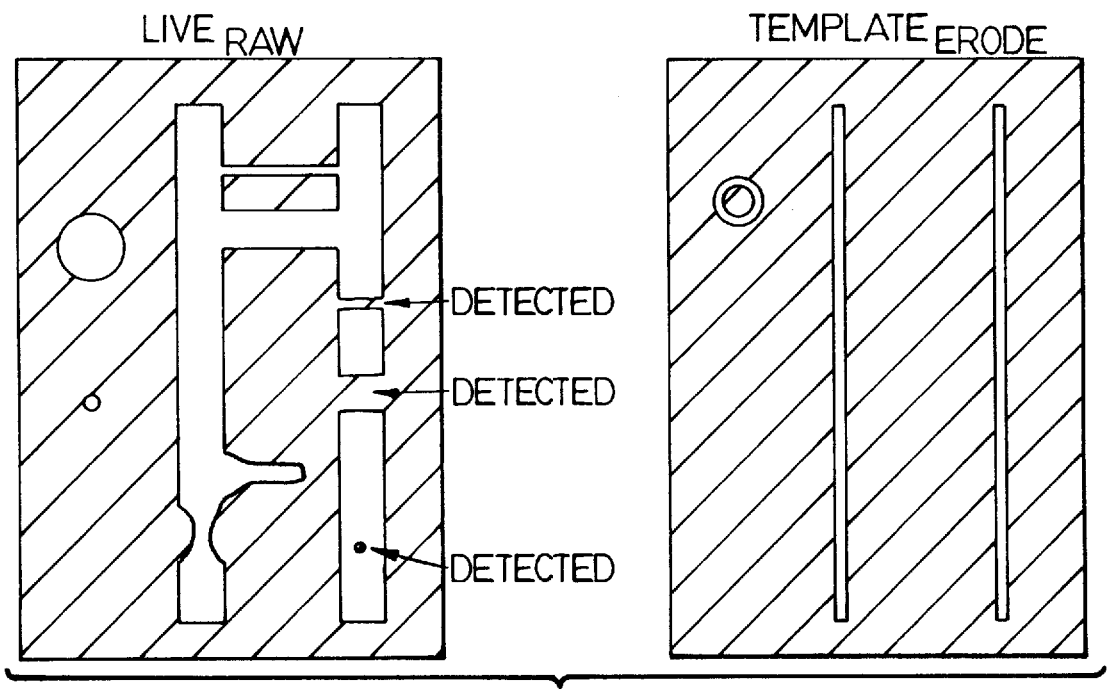
FIG. 20 shows a graphical representation of the results of a fourth binary comparison.
Figure 21:
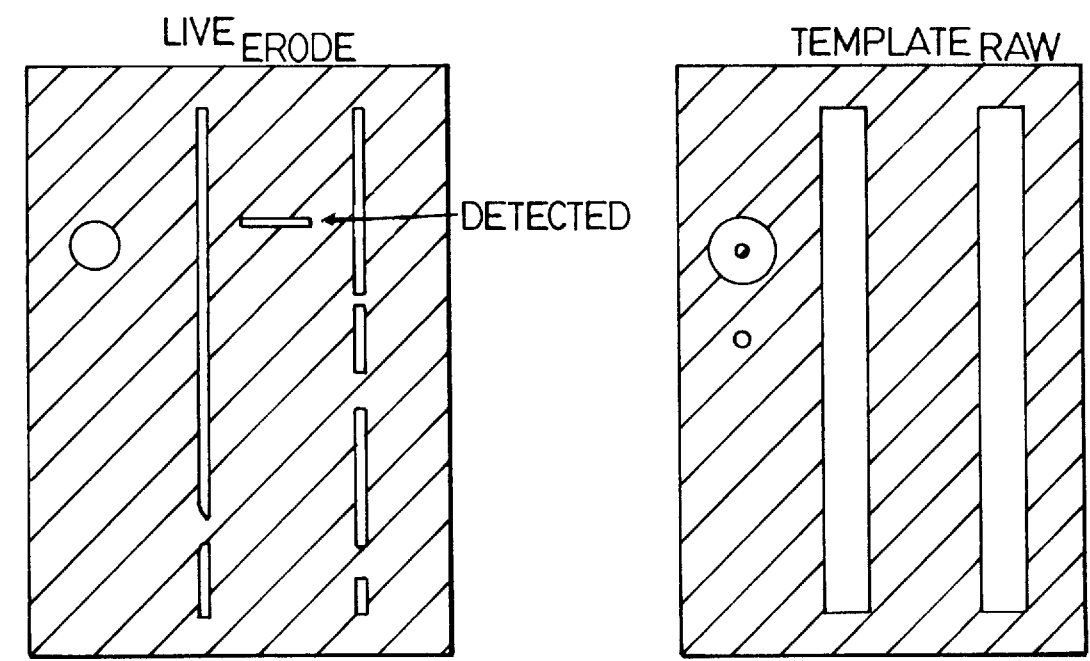
FIG. 21 shows a graphical representation of the results of a fifth binary comparison.
Figure 22:
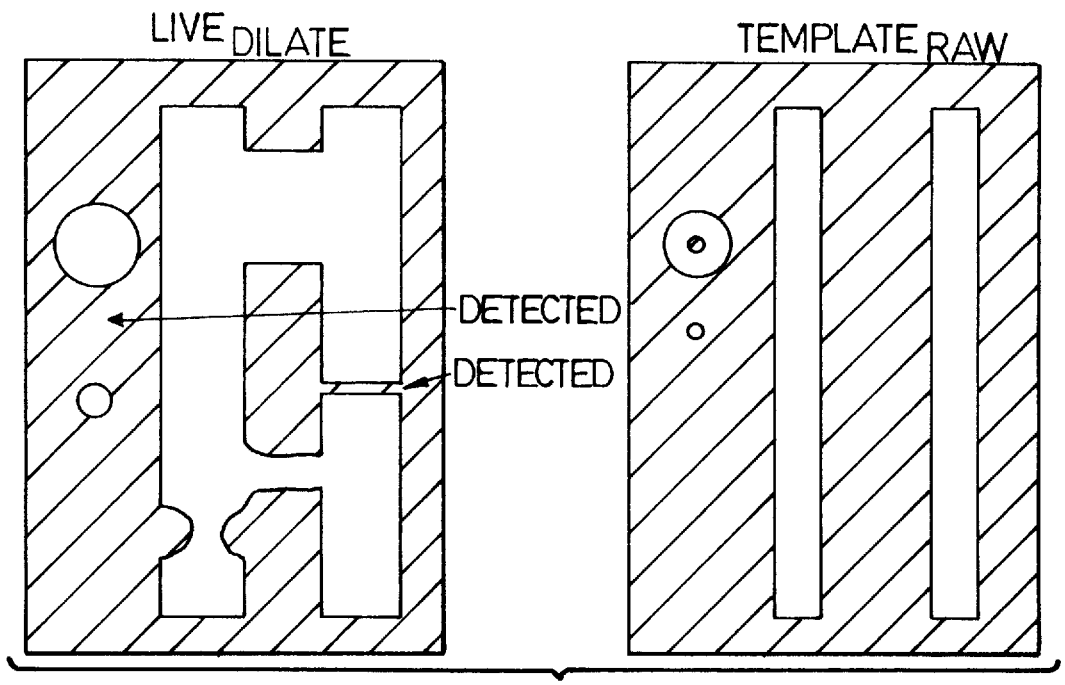
FIG. 22 shows a graphical representation of the results of a sixth binary comparison.
Figure 23:
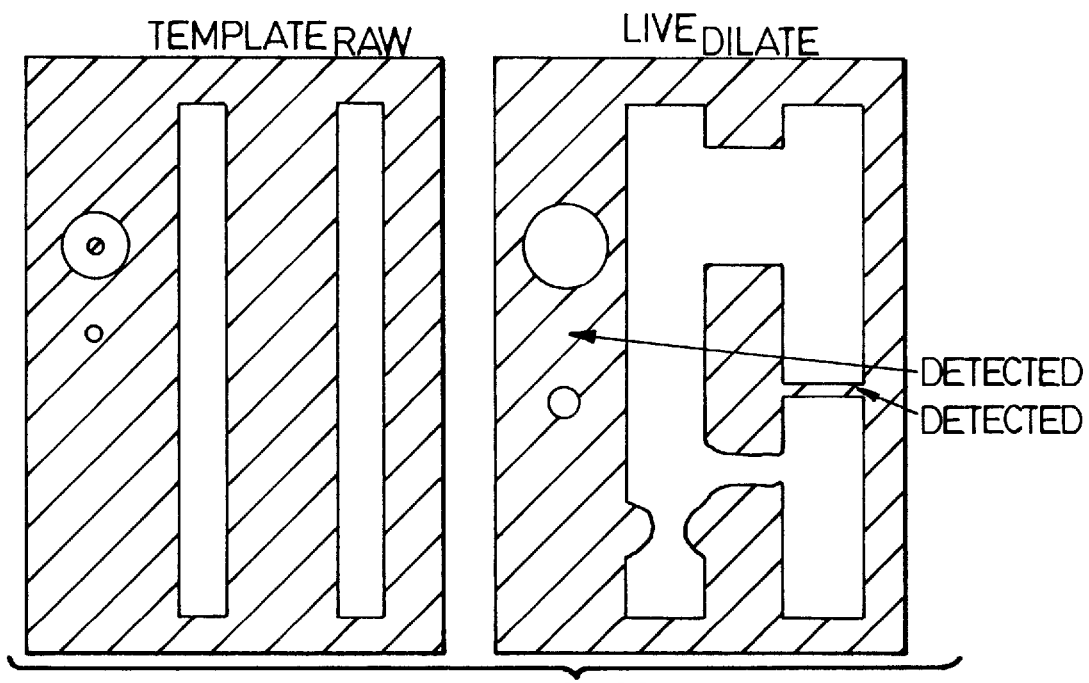
FIG. 23 shows a graphical representation of the results of a seventh binary comparison.
Figure 24:
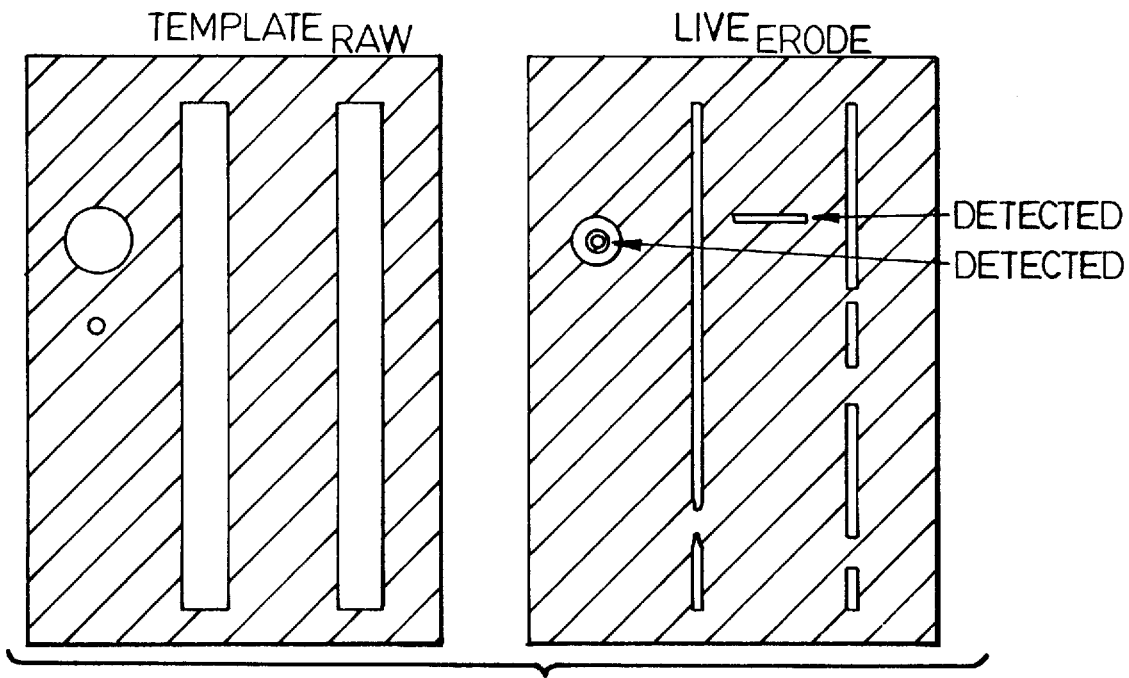
FIG. 24 shows a graphical representation of the results of an eighth binary comparison.
Figure 25:
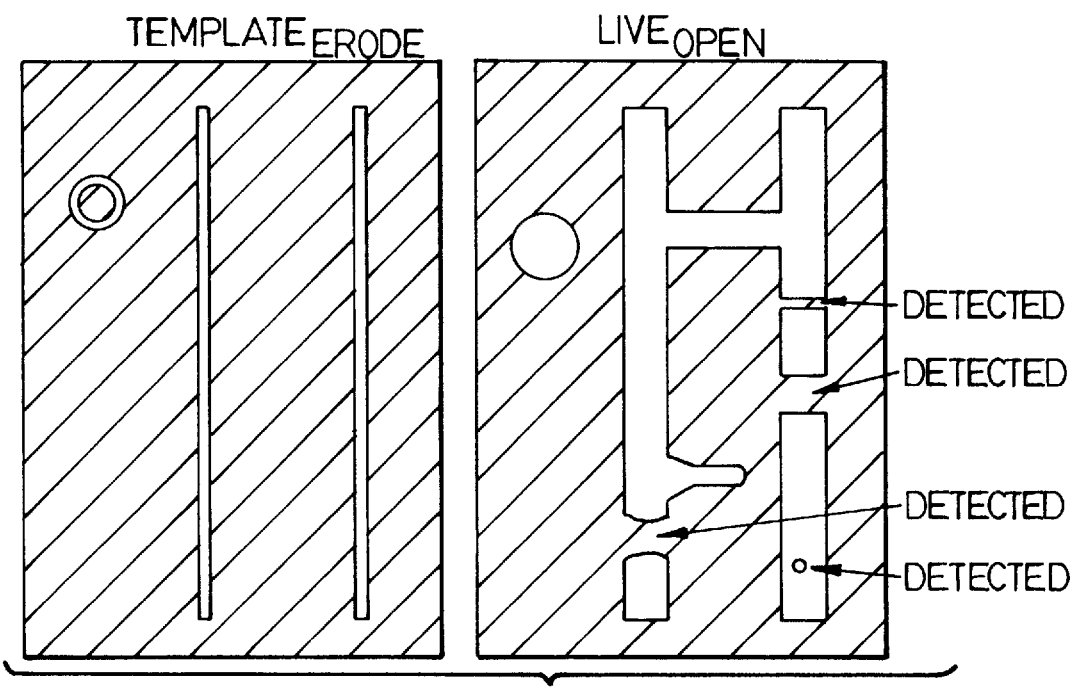
FIG. 25 shows a graphical representation of the results of a ninth binary comparison.
Figure 26:
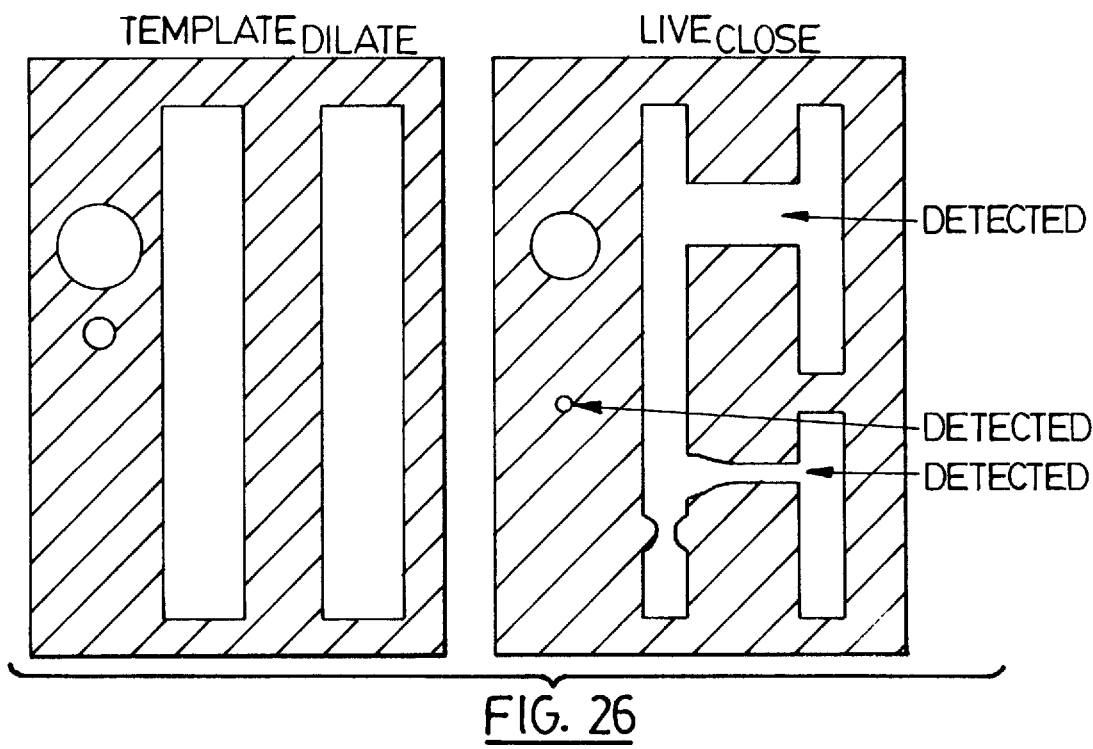
FIG. 26 shows a graphical representation of the results of a tenth binary comparison.

For example, FIG. 17 demonstrates that the "If Template$_{ERODE}$=1 then Live must=1" comparison (labeled (1) in Appendix A) will identify the two horizontal breaks in the right hand vertical copper trace and will detect the pinhole adjacent the bottom of the same trace. However, as is also shown, the other defects, including "neck-down", "extra copper" and "small feature missing" defects are not detected by this comparison. FIGS. 18 through 26 respectively show examples of the defects detected by the comparisons labeled (2) through (10) in Appendix A.

It will be apparent to those of skill in the art that not all ten binary comparisons need be performed, nor do the comparisons need to be performed in a particular order. For example, as mentioned above, some of the binary comparisons are redundant when the background of the acquired image is merely the inverse of the foreground. Also, some pattern establishment processes are not subject to all types of defects. Accordingly, it is contemplated that the selection of appropriate binary comparisons and the order in which they are conducted will be readily ascertained by those employing the present invention.

Figure 27:
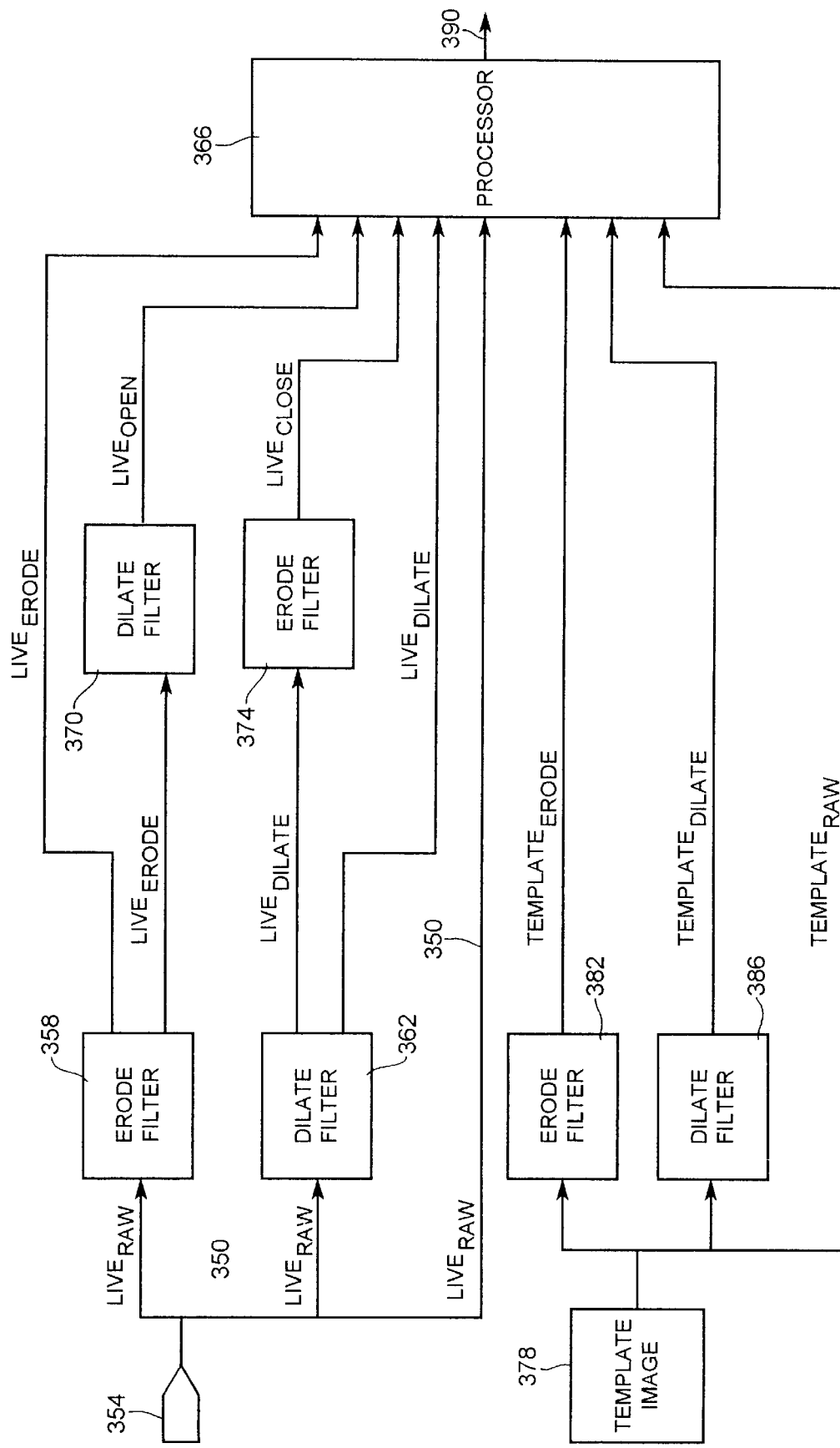
FIG. 27 shows a block diagram of a preferred configuration of a binary system in accordance with the present invention.

FIG. 27 shows a block diagram of an implementation of the presently preferred binary embodiment of the instant invention. As shown in the Figure, the Live$_{RAW}$ image 350 from an appropriate camera 354 is transmitted to each of two binary correlation filters 358 and 362 and directly to the processor 366. Binary correlation filter 358 produces the Live$_{ERODE}$ data which is transmitted to Processor 366 and to binary correlation filter 370 which performs a dilate operation to produce the Live$_{OPEN}$ data which is also transmitted to Processor 366. Binary correlation filter 362 produces the Live$_{DILATE}$ data which is transmitted to Processor 366 and to binary correlation filter 374 which performs an erode operation to produce the Live$_{CLOSE}$ data which is also transmitted to Processor 366.

The Template$_{RAW}$ data 378, which can either be stored in memory or obtained from a previous verification operation, is transmitted to each of two binary correlation filters 382 and 386 and directly to Processor 366. Binary correlation filter 382 produces the Template$_{ERODE}$ data and binary correlation filter 386 produces the Template$_{DILATE}$ data, each of which are also transmitted to Processor 366. Processor 366 performs the selected comparisons, combines the results of those comparisons and generates an appropriate defect detection output 390.

Figure 28:
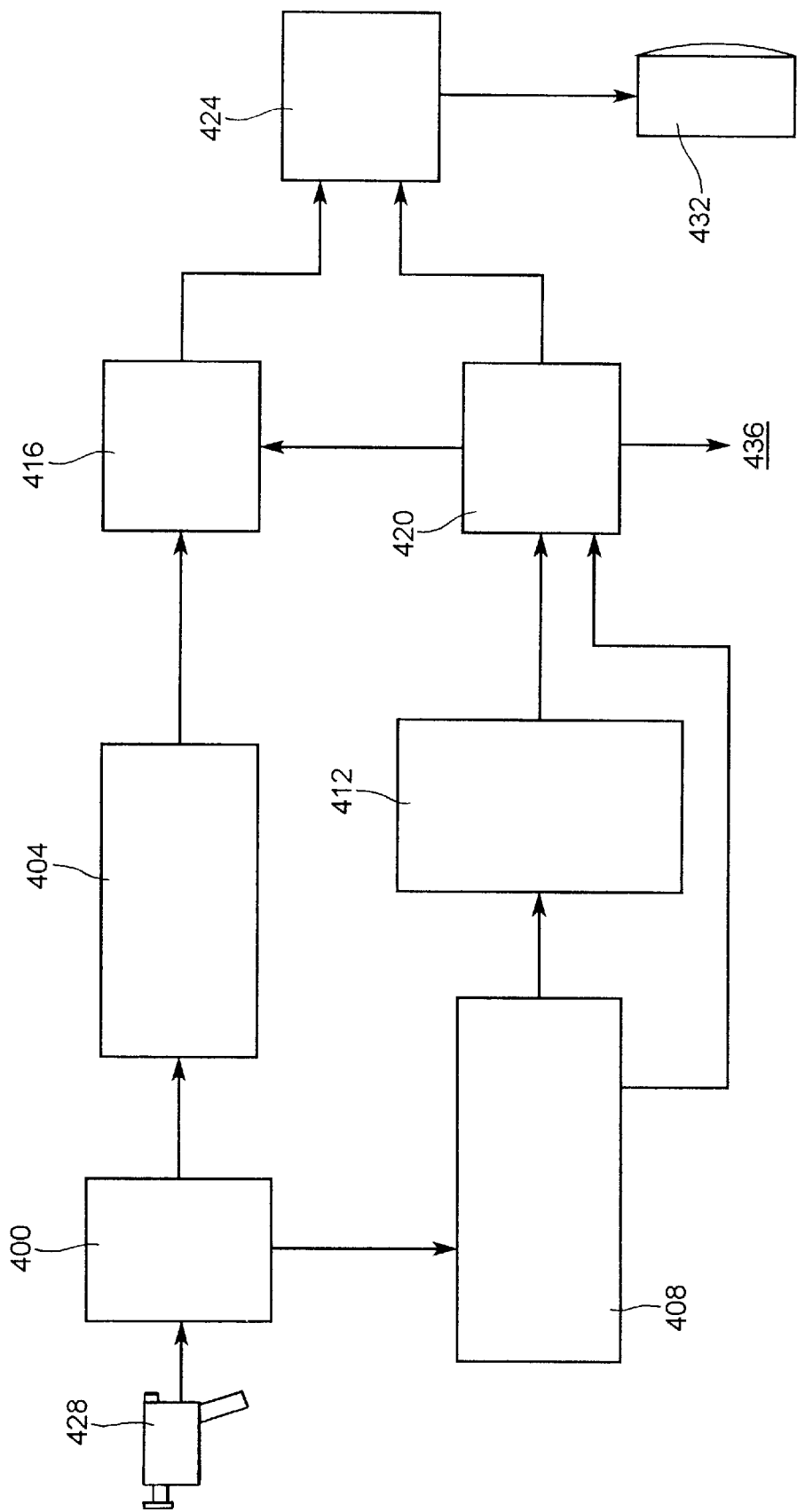
FIG. 28 shows the system of FIG. 27 as implemented in commercially available Cyberscan® modules.

As will be apparent, for clarity FIG. 27 omits the buffers and other related functions which may be required to completely implement the system. However, FIG. 28 shows an embodiment of the system of FIG. 27 which has been constructed from commercially available Cyberscan® modules. In this Figure, eight Cyberscan® modules are employed, and specifically the system comprises: a CAM-DDC3-00 camera module 400; two BUF-1000-00 buffer modules 404, 408; a BMF-8000-00 binary morphology module 412; a LUT-1000-00 look up table module 416; a BLB-1000-00 blob module 420; and a PCD-1000-00 display module 424. In this implementation, the Live$_{RAW}$ image, is acquired by a suitable camera 428 and any defects detected by the system are displayed to an operator on a conventional monitor 432. Output 436 may be used to provide detected defect results to a host computer via, for example, an RS-232 serial interface.

The above-described embodiments are intended to be examples of the present invention and alterations and modifications may be effected thereto, by those of skill in the art, without departing from the scope of the invention which is defined solely by the claims appended hereto.

APPENDIX A (1) If Template$_{ERODE}$=1, then Live$_{RAW}$ must=1. Used for detecting open defects in foreground, i.e.—pinholes or breaks in copper. Illustrated in FIG. 17.

(2) If Template$_{DILATE}$=0, then Live$_{RAW}$ must=0. Used for detecting open defects in background, i.e.—extra copper in a void, a short circuit. Illustrated in FIG. 18.

(3) If Live$_{RAW}$=1, then Template$_{DILATE}$ must=1. Used for detecting open defects in background, i.e.—extra copper in a void, a short circuit. Illustrated in FIG. 19.

(4) If Live$_{RAW}$=0, then Template$_{ERODE}$ must=0. Used for detecting open defects in foreground, i.e.—pinholes in copper. Illustrated in FIG. 20.

(5) If Live$_{ERODE}$=1, then Template$_{RAW}$ must=1. Used for detecting relatively large open defects in background, i.e.—large areas of extra copper, big short circuits. Illustrated in FIG. 21.

(6) If Live$_{DILATE}$=0, then Template$_{RAW}$ must=0. Used for detecting relatively large open defects in foreground and small missing foreground features, i.e.—large copper voids or missing small paths. Illustrated in FIG. 22.

(7) If Template$_{RAW}$=1, then Live$_{DILATE}$ must=1. Used for detecting small missing foreground features, i.e.—copper pad missing. Illustrated in FIG. 23.

(8) If Template$_{RAW}$=0, then Live$_{ERODE}$ must=0. Used for detecting small missing background features, i.e.—a drill hole in copper is missing. Illustrated in FIG. 24.

(9) If Template$_{ERODE}$=1, then Live$_{OPEN}$ must=1. Used for detecting narrowing of foreground features, i.e.—copper trace narrows, but is not broken. Often referred to as 'neck-down'. Illustrated in FIG. 25.

(10) If Template$_{DILATE}$=0, then Live$_{CLOSE}$ must=0. Used for detecting narrowing of background features, i.e.—copper trace widens, but is not shorted. Often referred to as 'projection'. Illustrated in FIG. 26.

We claim:

1. A method of determining if an established pattern contains one or more defects, comprising the steps of:
   (i) defining a digital template image representing a desired pattern;
   (ii) acquiring a digital image of an established pattern;
   (iii) performing a first gray scale morphological image processing filter operation on said digital template to obtain a first resultant image;
   (iv) performing a second gray scale morphological image processing filter operation on said acquired digital image to obtain a second resultant image;
   (v) performing at least one pair of pixel value comparisons comprising determining a first difference between corresponding pixels of said first resultant image and pixels of said acquired digital image and a second difference between corresponding pixels of said second resultant image and pixels of said defined template;
   (vi) comparing each of the determined pixel value differences to determine if a defect is present in said established pattern, the type of defect being determined defined by the first and second gray scale morphological image processing filter operations performed in steps (iii) and (iv) and the presence of that type of defect being indicated when said determined difference exceeds a difference defined for that type of defect.

2. The method of claim 1 wherein one of said first and second gray scale morphological image processing filter operations is an erode filter operation and the other of said first and second gray scale morphological image processing filter operations is a dilate filter operation.

3. The method of claim 2 wherein said erode filter operation and said dilate filter operation are each implemented as rank value filters.

4. The method of claim 2 wherein:
   step (iii) said digital template is processed with each of an erode filter operation and a dilate filter operation to produce a resultant eroded template image and a resultant dilated template image and in step (iv) said acquired digital image is processed with each of an erode filter operation and a dilate filter operation to produce a resultant eroded acquired image and a resultant dilated acquired image;
   step (v) comprises performing a comparison between said acquired digital image and said resultant eroded template image, a comparison between said acquired digital image and said resultant dilated template image, a comparison between said defined template image and said resultant dilated acquired image and a comparison between said defined template image and said resultant eroded acquired image; and
   step (vi) comprises determining from the pixel value differences resulting from determined four comparisons performed in step (v) if said established pattern contains one or more defects.

5. The method of claim 4 wherein step (vi) further comprises combining the results of the determination of a defect based upon said pixel value difference of said acquired digital image and said resultant eroded template image and the determination of a defect based upon the pixel difference of said acquired digital image and said resultant dilated template image with a logical OR operation to determine if the established pattern contains at least one of an extra light feature or an extra dark feature.

6. The method of claim 5 wherein step (vi) further comprises combining the results of the determination of a defect based upon said pixel value difference of said defined template image and said resultant dilated acquired image and the determination of a defect based upon said pixel difference of said defined template image and said resultant eroded acquired image with a logical OR operation to determine if the established pattern is missing at least one of a light feature or a dark feature.

7. The method of claim 4 wherein step (vi) further comprises combining the results of the determination of a defect based upon said pixel value difference of said defined template image and said resultant dilated acquired image and the determination of a defect based upon said pixel difference of said defined template image and said resultant eroded acquired image with a logical OR operation to determine if the established pattern is missing at least one of a light feature or a dark feature.

8. The method of claim 4 wherein said resultant dilated template image and said resultant eroded template image are stored in a memory means.

9. The method of claim 4 wherein said comparisons of steps (v) are performed substantially simultaneously.

10. The method of claim 1 wherein each of said pair of pixel value comparisons in step (v) are performed substantially in parallel.

11. The method of claim 1 wherein said defined template image and said first resultant image are stored in a memory means.

12. The method of claim 1 wherein said comparisons of steps (iv) and (v) are performed substantially simultaneously.

13. The method of claim 1 wherein said template image is defined by acquiring a suitable image with a camera.

14. A system to determine if an established pattern contains one or more defects, comprising:

means to store a defined digital template for said pattern;

means to acquire a digital image of said established pattern;

gray scale morphological image processing filter means to process said defined digital template to obtain a first resultant image and to process said acquired digital image to obtain a second resultant image;

means to perform at least one pair of pixel value comparisons comprising a first comparison between corresponding pixels of said first resultant image and pixels of said acquired image and a second comparison between corresponding pixels of said second resultant image and pixels of said defined digital template; and means to evaluate the differences in pixel values resulting from each comparison to determine if said established pattern contains one or more defects, the type of defect being detected being determined according to said gray scale morphological image processing filter operations performed and the presence of that type of defect being indicated by a difference in said corresponding pixel values exceeding a difference defined for that type of defect.

15. The system of claim 14 wherein said gray scale morphological image processing filter means comprises an erode filter and a dilate filter.

16. The system of claim 15 wherein each of said erode filter and said dilate filter are implemented as rank value filters.

17. The system of claim 14 wherein said gray scale morphological image processing filter means further comprises at least one of a series combination of an erode and a dilate filter and a series combination of a dilate and an erode filter.

18. The system of claim 14 wherein said first resultant image is stored in a memory.

19. The system of claim 14 wherein said defined digital template is a previously acquired digital image.

20. The system of claim 14 wherein said gray scale morphological image processing filter means performs said processing to obtain said first and second resultant images substantially in parallel.

* * * * *